(12) United States Patent
Ghosh et al.

(10) Patent No.: US 8,688,701 B2
(45) Date of Patent: Apr. 1, 2014

(54) RANKING AND SELECTING ENTITIES BASED ON CALCULATED REPUTATION OR INFLUENCE SCORES

(75) Inventors: Rishab Aiyer Ghosh, Brussels (BE); Vipul Ved Prakash, San Francisco, CA (US)

(73) Assignee: Topsy Labs, Inc, San Francisco, CA (US)

( * ) Notice: Subject to any disclaimer, the term of this patent is extended or adjusted under 35 U.S.C. 154(b) by 419 days.

(21) Appl. No.: 12/628,791

(22) Filed: Dec. 1, 2009

(65) Prior Publication Data

US 2010/0153404 A1    Jun. 17, 2010
US 2012/0284282 A9    Nov. 8, 2012

Related U.S. Application Data

(63) Continuation-in-part of application No. 11/809,489, filed on Jun. 1, 2007, now Pat. No. 7,831,536.

(60) Provisional application No. 61/200,664, filed on Dec. 1, 2008.

(51) Int. Cl.
     *G06F 7/00*        (2006.01)
     *G06F 17/30*     (2006.01)

(52) U.S. Cl.
USPC ........... 707/736; 707/748; 707/769; 707/798; 706/54

(58) Field of Classification Search
None
See application file for complete search history.

(56) References Cited

U.S. PATENT DOCUMENTS

| 6,151,585 | A | 11/2000 | Altschuler et al. |
| 6,286,005 | B1 * | 9/2001 | Cannon ..................... 705/14.66 |
| 7,512,612 | B1 | 3/2009 | Akella et al. |
| 8,086,605 | B2 * | 12/2011 | Xu et al. ...................... 707/732 |
| 8,166,026 | B1 | 4/2012 | Sadler |

(Continued)

FOREIGN PATENT DOCUMENTS

| WO | WO2006/116516 A2 | 11/2006 |
| WO | WO2008/006059 A2 | 1/2008 |

OTHER PUBLICATIONS

Liu, "Co-authorship networks in the digital library research community", 2005, Elsevier, Information Processing and Management 41 (2005) pp. 1462-1480.

(Continued)

*Primary Examiner* — Sherief Badawi
*Assistant Examiner* — Loan T Nguyen
(74) *Attorney, Agent, or Firm* — Paul Davis; Mintz Levin

(57) ABSTRACT

Ranking and selecting entities based on calculated reputation or influence scores is provided. In some embodiments, a method includes determining whether a first entity is a subject or an object; determining whether a second entity is a subject or an object; and generating a graph, in which a subset of the graph is a subject graph of subject nodes that includes at least one or more subjects (e.g., subject entities) linked to one or more other subjects, and in which the graph includes one or more objects (e.g., object entities) each linked to one or more subjects in the subject graph. In some embodiments, the graph includes directed and undirected links. In some embodiments, the graph includes one or more objects linked to one or more objects.

27 Claims, 6 Drawing Sheets

(56) References Cited

U.S. PATENT DOCUMENTS

| | | |
|---|---|---|
| 2003/0110056 A1 | 6/2003 | Berghofer et al. |
| 2003/0229531 A1 | 12/2003 | Heckerman et al. |
| 2004/0225592 A1 | 11/2004 | Churquina |
| 2005/0060312 A1 | 3/2005 | Curtiss et al. |
| 2005/0192957 A1 | 9/2005 | Newbold |
| 2005/0256886 A1 | 11/2005 | Armanino et al. |
| 2006/0041543 A1 | 2/2006 | Achlioptas |
| 2006/0059055 A1 | 3/2006 | Lin |
| 2006/0074836 A1 | 4/2006 | Gardner et al. |
| 2006/0218577 A1 | 9/2006 | Goodman et al. |
| 2006/0294085 A1 | 12/2006 | Rose et al. |
| 2006/0294086 A1 | 12/2006 | Rose et al. |
| 2006/0294134 A1 | 12/2006 | Berkhim et al. |
| 2007/0027744 A1 | 2/2007 | Carson et al. |
| 2007/0078699 A1 | 4/2007 | Scott et al. |
| 2007/0121843 A1* | 5/2007 | Atazky et al. ............ 379/114.13 |
| 2007/0124432 A1* | 5/2007 | Holtzman et al. ............ 709/219 |
| 2007/0150398 A1 | 6/2007 | Rossen et al. |
| 2007/0156636 A1 | 7/2007 | Norton et al. |
| 2007/0168533 A1 | 7/2007 | Canright et al. |
| 2007/0208613 A1 | 9/2007 | Backer |
| 2007/0219863 A1 | 9/2007 | Park et al. |
| 2007/0226248 A1 | 9/2007 | Darr |
| 2007/0282867 A1 | 12/2007 | Mcallister et al. |
| 2007/0297405 A1 | 12/2007 | He |
| 2008/0004942 A1 | 1/2008 | Calabria |
| 2008/0059466 A1 | 3/2008 | Luo et al. |
| 2008/0104225 A1 | 5/2008 | Zhang et al. |
| 2008/0133426 A1 | 6/2008 | Porat et al. |
| 2008/0215571 A1 | 9/2008 | Huang et al. |
| 2008/0275833 A1 | 11/2008 | Zhou et al. |
| 2008/0288305 A1* | 11/2008 | LaLuzerne et al. ................ 705/7 |
| 2008/0288596 A1 | 11/2008 | Smith et al. |
| 2008/0313011 A1* | 12/2008 | Rose et al. ....................... 705/10 |
| 2009/0049038 A1 | 2/2009 | Gross |
| 2009/0106224 A1 | 4/2009 | Roulland et al. |
| 2009/0119173 A1 | 5/2009 | Parsons et al. |
| 2009/0234828 A1 | 9/2009 | Tu |
| 2009/0240647 A1 | 9/2009 | Green et al. |
| 2009/0276500 A1 | 11/2009 | Karmarkar |
| 2009/0319342 A1 | 12/2009 | Shilman et al. |
| 2010/0058196 A1 | 3/2010 | Krishnan et al. |
| 2010/0070448 A1* | 3/2010 | Omoigui .......................... 706/47 |
| 2010/0100537 A1 | 4/2010 | Druzgalski et al. |
| 2010/0119053 A1 | 5/2010 | Goeldi |
| 2010/0121817 A1 | 5/2010 | Meyer |
| 2010/0121839 A1 | 5/2010 | Meyer |
| 2010/0174692 A1 | 7/2010 | Meyer |
| 2010/0306192 A1 | 12/2010 | Kapur et al. |
| 2011/0004465 A1 | 1/2011 | Rose et al. |
| 2011/0022602 A1 | 1/2011 | Luo et al. |
| 2011/0078156 A1 | 3/2011 | Koss |
| 2011/0093459 A1 | 4/2011 | Dong et al. |
| 2011/0191372 A1 | 8/2011 | Kaushansky et al. |
| 2011/0212717 A1 | 9/2011 | Rhoads et al. |
| 2012/0166438 A1 | 6/2012 | Wu et al. |

OTHER PUBLICATIONS

Von Der Weth, "Towards an objective assessment of centrality measures in reputation systems", 2007, IEEE, 0-7695-2913.

Zhou, "Powertrust: A robust and scalable reputation system for trusted peer-to-peer computing", 2007, IEEE, 1-45-921907.

Guha, R., Kumar, R., Raghavan, P., and Tomkins, A. 2004. Propagation of trust and distrust. In Proceedings of the 13th International Conference on World Wide Web (New York, NY, USA, May 17-20, 2004). WWW '04. ACM, New York, NY, pp. 403-412.

Ziegler, C. and Lausen, G. 2005. Propagation Models for Trust and Distrust in Social Networks. Information Systems Frontiers 7, 4-5 (Dec. 2005), 337-358.

Tao, Yufei et al: "Selectivity Estimation of Predictive Spatio-Temporal Queries", Proceedings 19th International Conference on Data Engineering (ICDE'2003). Bangladore, India, Mar. 5-8, 2003; pp. 417-428.

Dai, Na et al: "Mining Anchor Text Trends for Retrieval" Mar. 28, 2010; pp. 127-139.

Ashkan, Azin et al: "Classifying and Characterizing Query Intent", Apr. 6, 2009, pp. 578-586.

Garfield, E: "Citation Analysis as a Tool in Journal Evaluation", 1972, pp. 527-544, XP002381248.

Johnson, Caleb: "Likebutton.me Reveals What Your Friends 'Like' Across the Web"; Apr. 26, 2010, pp. 1-7; XP000002656471.

Anonymous: "H-index", Wikipedia, Internet Article, Jun. 10, 2010; pp. 1-3; XP000002656472.

Dietz, Laura et al: "Unsupervised Prediction of Citation Influences", Proceedings of the 24th International Conference on Machine Learning, Jun. 20, 2007; pp. 233-240; XP55004362.

Huang, Jeff et al: "Conversational Tagging in Twitter", Proceedings of the 21st ACM Conference on Hypertext and Hypermedia; Jun. 13, 2010; p. 173; XP55004356.

Page, L. et al: "The PageRank Citation Ranking: Bringing Order to the Web", Internet Citation; Jan. 29, 1998; XP002213518.

Massa, Paolo et al: "Using Trust in Recommender Systems: An Experimental Analysis"; Feb. 26, 2004; pp. 221-235, section 1.1; pp. 222-223, sections 1.3 and 2; pp. 225-227.

Makkonen et al., Topic Detection and Tracking with Spatio-Temporal Evidence, published Spring 2003.

Lu at al., "Finding Query Suggestions for PubMed", 2009, AMIA.

* cited by examiner

RANKING AND SELECTING ENTITIES BASED ON CALCULATED REPUTATION OR INFLUENCE SCORES

CROSS REFERENCE TO OTHER APPLICATIONS

This application claims priority to U.S. Provisional Patent Application No. 61/200,664 entitled SYSTEM AND METHOD OF RANKING AND SELECTING ENTITIES BASED ON CALCULATED REPUTATION OR INFLUENCE SCORES filed Dec. 1, 2008, which is incorporated herein by reference for all purposes. This application is also a continuation-in-part of U.S. Ser. No. 11/809,489, filed Jun. 1, 2007 (now U.S. Pat. No. 7,831,536).

BACKGROUND OF THE INVENTION

Knowledge is increasingly more germane to our exponentially expanding information-based society. Perfect knowledge is the ideal that participants seek to assist in decision making and for determining preferences, affinities, and dislikes. Practically, perfect knowledge about a given topic is virtually impossible to obtain unless the inquirer is the source of all of information about such topic (e.g., autobiographer). Armed with more information, decision makers are generally best positioned to select a choice that will lead to a desired outcome/result (e.g., which restaurant to go to for dinner). However, as more information is becoming readily available through various electronic communications modalities (e.g., the Internet), one is left to sift through what is amounting to a myriad of data to obtain relevant and, more importantly, trust worthy information to assist in decision making activities. Although there are various tools (e.g., search engines, community boards with various ratings), there lacks any indicia of personal trustworthiness (e.g., measure of the source's reputation and/or influence) with located data.

SUMMARY OF THE INVENTION

A new graph is proposed wherein each node represents either a subject, which can be a user, or an object, which can be a content item cited by the user, and each edge represents a citation, which is an expression of opinion or description by a user on an object. Additionally, a new method is proposed for generating and ranking search result based on matching of the search terms with the content of the citations of the objects by the users.

BRIEF DESCRIPTION OF THE DRAWINGS

Various embodiments of the invention are disclosed in the following detailed description and the accompanying drawings.

DETAILED DESCRIPTION

Figure 1:
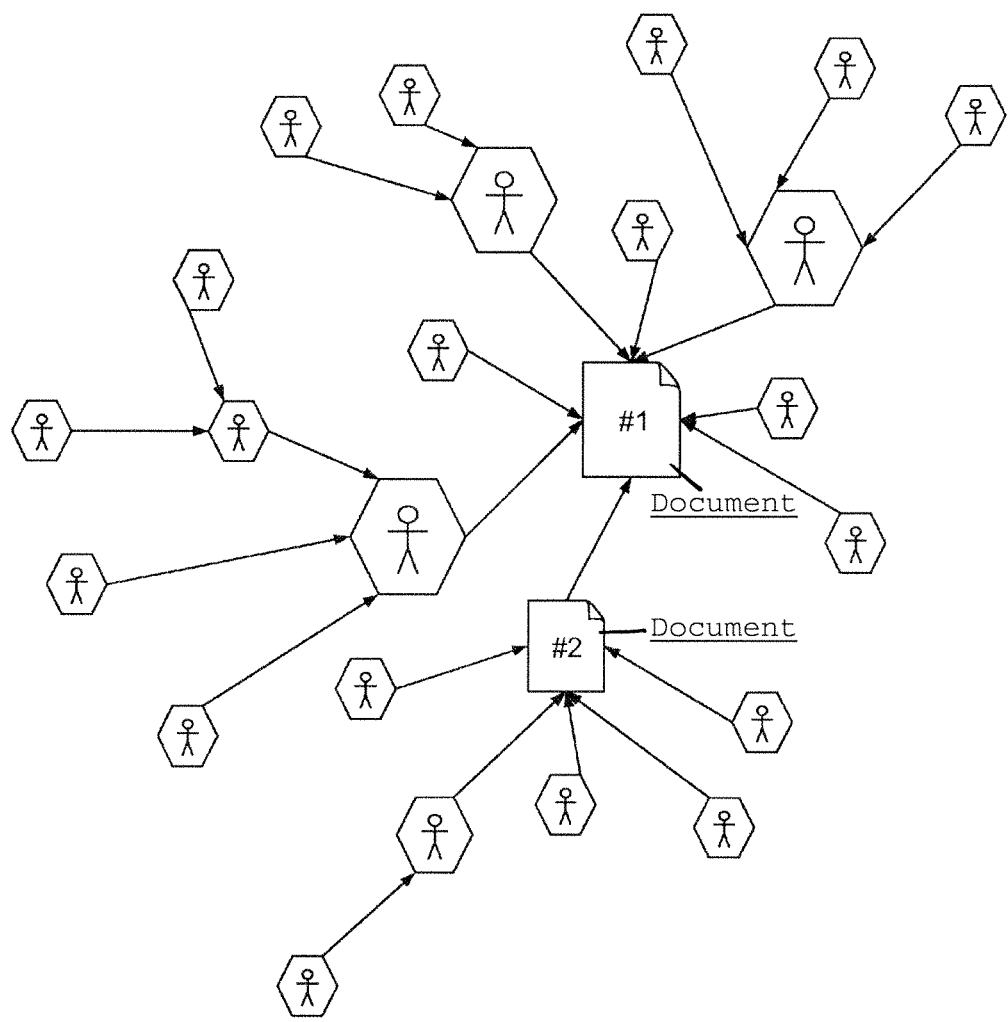
FIG. 1 is an illustrative model of the World Wide Web showing individuals linked to other individuals and to documents they author.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Currently, a person seeking to locate information to assist in a decision, to determine an affinity, and/or identify a dislike can leverage traditional non-electronic data sources (e.g., personal recommendations—which can be few and can be biased) and/or electronic data sources such as web sites, bulletin boards, blogs, and other sources to locate (sometimes rated) data about a particular topic/subject (e.g., where to stay when visiting San Francisco). Such an approach is time consuming and often unreliable as with most of the electronic data there lacks an indicia of trustworthiness of the source of the information. Failing to find a plethora (or spot on) information from immediate non-electronic and/or electronic data source(s), the person making the inquiry is left to make the decision using limited information, which can lead to less than perfect predictions of outcomes, results, and can lead to low levels of satisfaction undertaking one or more activities for which information was sought.

Current practices also do not leverage trustworthiness of information or, stated differently, attribute a value to the reputation of the source of data (e.g., referral). With current practices, the entity seeking the data must make a value judgment on the reputation of the data source. Such value judgment is generally based on previous experiences with the data source (e.g., rely on Mike's restaurant recommendations as he is a chef and Laura's hotel recommendations in Europe as she lived and worked in Europe for 5 years). Unless the person making the inquiry has an extensive network of references from which to rely to obtain desired data needed to make a decision, most often, the person making the decision is left to take a risk or "roll the dice" based on best available non-attributed (non-reputed) data. Such a prospect often leads certain participants from not engaging in a contemplated activity.

Reputation accrued by persons in such a network of references are subjective. In other words, reputation accrued by persons in such a network of references appear differently to each other person in the network, as each person's opinion is formed by their own individual networks of trust.

Real world trust networks follow a small-world pattern, that is, where everyone is not connected to everyone else directly, but most people are connected to most other people through a relatively small number of intermediaries or "connectors". Accordingly, this means that some individuals within the network may disproportionately influence the opinion held by other individuals. In other words, some people's opinions may be more influential than other people's opinions.

In some embodiments, influence is provided for augmenting reputation, which may be subjective. In some embodiments, influence is provided as an objective measure. For example, influence can be useful in filtering opinions, information, and data.

It will be appreciated that reputation and influence provide unique advantages in accordance with some embodiments for the ranking of individuals or products or services of any type in any means or form.

Accordingly, systems and methods in accordance with some embodiments are provided allowing for the use of reputation scores and/or influence scores to determine at least in part, in combination with other methods and systems, the ranking of any subset of individual entities in a given set of entities; in which the entities include any of the following: documents on the Internet, products, services, data files, legal or natural persons, or any entities in any form or means that can be represented within the computer network. The systems and methods described herein in accordance with some embodiments provide that a subset of the ranked entities are made available based on selection criteria, such as rank, date or time, geography/location associated with the entity, and/or any other selection criteria. The systems and methods described herein in accordance with some embodiments provide that the influence and/or reputation are estimated using any technique, including but not limited to the various techniques described herein.

The systems and methods described herein in accordance with some embodiments provide for the use of reputation scores and/or influence scores to determine at least in part, in combination with other methods and systems, the ranking of any subset of individual entities in a given set of entities; in which the entities include natural or legal persons, or other entities such as computational processes, documents, data files, or any form of product or service or information of any means or form for which a representation has been made. In some embodiments, the measures of influence and reputation are on dimensions that, for example, are related to a specific topic (e.g., automobiles or restaurants), or source (e.g., a weblog or Wikipedia entry or news article or Twitter feed), or search term (e.g., key words or phrases specified in order to define a subset of all entities that match the search term(s)), in which a subset of the ranked entities are made available based on selection criteria, such as the rank, date or time, or geography/location associated with the entity, and/or any other selection criteria.

An illustrative implementation of systems and methods described herein in accordance with some embodiments includes a social graph of individuals on the Internet, as shown in FIG. 1, in which the individuals represent natural or legal persons and the documents (e.g., #1 and #2) represent natural or legal persons, or other entities such as computational processes, documents, data files, or any form of product or service or information of any means or form for which a representation has been made within the computer network within this system.

In some embodiments, the social graph is directed (e.g., a directed graph). In some embodiments, the social graph is undirected (e.g., an undirected graph).

In some embodiments, the social graph is explicit, with individuals expressing a link to other individuals. In some embodiments, the social graph is implicit, with techniques for identifying the links between individuals, such as trust, respect, positive, or negative opinion.

In some embodiments, the links or edges of the social graph represent different forms of association including, for example, friendship, trust, acquaintance and the edges on the graph are constrained by dimensions representing ad-hoc types including but not limited to subjects, fields of interest, and/or search terms.

In some embodiments, the nodes of the social graph represent people or other entities (e.g., web pages; authors; reviewers; users of microblogging services, such as Twitter; users of social networks, such as MySpace or Facebook; bloggers; and/or any other entity) that include expressions of opinion, reviews, or other information useful for the estimation of influence, and that each node on the graph represents an influential entity, once influence for that node has been, for example, estimated.

In some embodiments, the nodes are placed in two categories, as subjects capable of having an opinion or making a citation, in which such expression is explicit, expressed, implicit, or imputed through any other technique; and as objects about which subjects have opinions or make citations; in which, for example, certain objects are also subjects; and in which an object has reputation scores indicating the possibly collective opinion of subjects on the object, and subjects have influence scores indicating the degree to which the subject's opinion influences other subjects.

In some embodiments, in which nodes are in two categories as described above, the reputation scores of objects are uses for the selection and ranking of objects, for example, weighted by the influence scores of the subjects related to the object, for example, in combination with other attributes of objects including to semantic or descriptive data regarding the object. In some embodiments, the subjects include one or more of the following: users of microblogging services such as Twitter, users of social networks such as MySpace or Facebook, bloggers, and reviewers. In some embodiments, the objects include one or more of the following: Internet web sites, blogs, music, videos, books, films, and other objects that can be represented with, for example, a Uniform Resource Identifier (URI). In some embodiments, the objects include entities that are each associated with a Uniform Resource Identifier (URI), wherein the subjects include entities representing authors of Internet content or users of social media services including one or more of the following: blogs, Twitter, and reviews on Internet web sites, wherein the links are citations of objects from subjects including one or more of the following: Tweets, blog posts, and reviews of objects on Internet web sites.

Figure 2:
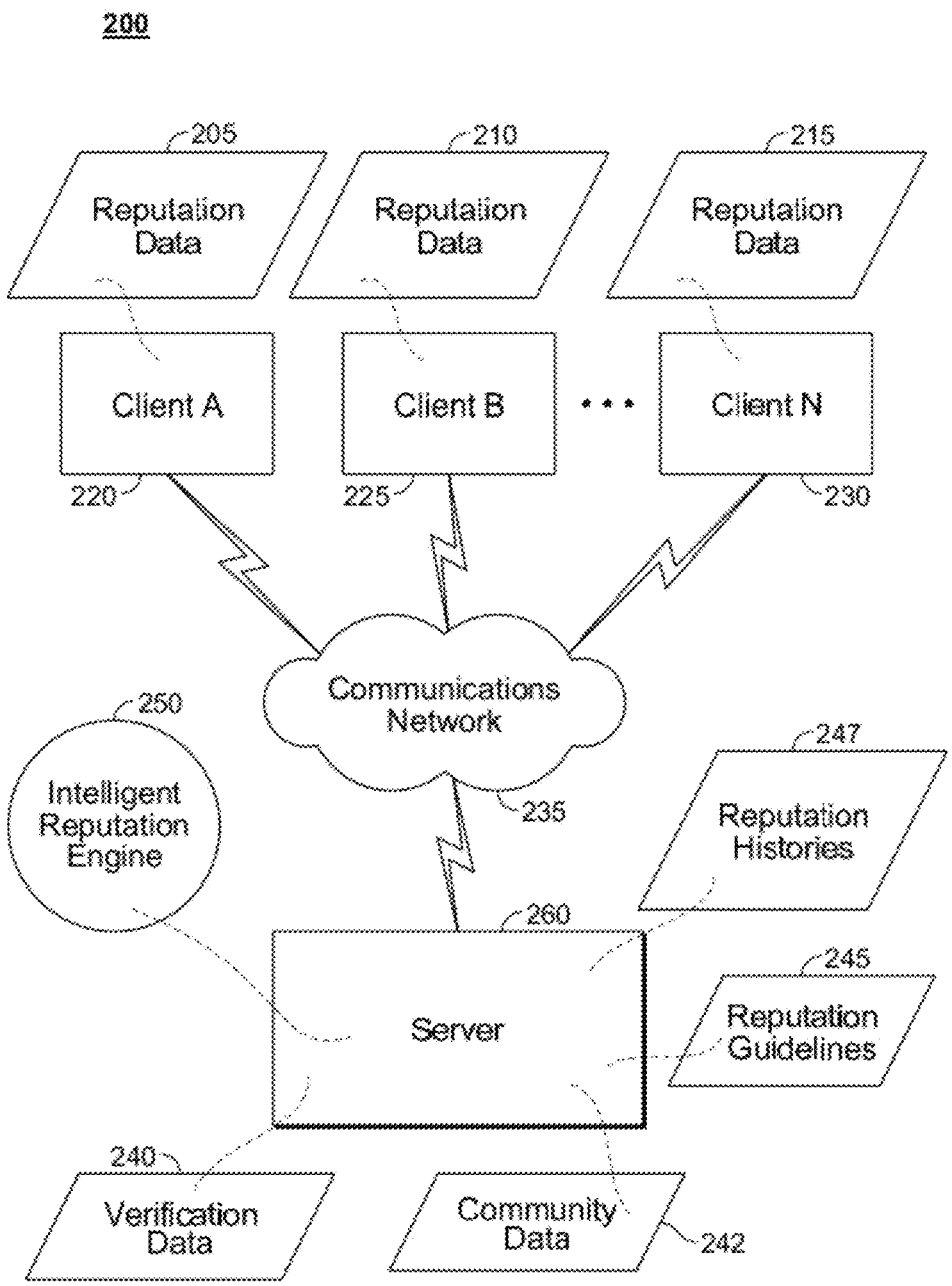
FIG. 2 is a block diagram showing the cooperation of exemplary components of another illustrative implementation in accordance with some embodiments.

FIG. 2 is a block diagram showing the cooperation of exemplary components of another illustrative implementation in accordance with some embodiments. In particular, FIG. 2 shows an illustrative implementation of exemplary reputation attribution platform 200 in accordance with some embodiments. As shown in FIG. 2, exemplary reputation attribution platform 200 includes client computing environment 220, client computing environment 225 up to and including client computing environment 230, communications network 235, server computing environment 260, intelligent reputation engine 250, verification data 240, community data 242, reputation guidelines 245, and reputation histories data 247. Also, as shown in FIG. 2, exemplary reputation attribution platform 200 includes a plurality of reputation data (e.g., inputted and/or generated reputation data) 205, 210, and 215 which can be displayed, viewed, stored, electronically transmitted, navigated, manipulated, stored, and printed from client computing environments 220, 225, and 230, respectively.

In some embodiments, in an illustrative operation, client computing environments 220, 225, and 230 can communicate and cooperate with server computing environment 260 over communications network 235 to provide requests for and receive reputation data 205, 210, and 215. In the illustrative operation, intelligent reputation engine 250 can operate on server computing environment 260 to provide one or more instructions to server computing environment 260 to process requests for reputation data 205, 210, and 215 and to electronically communicate reputation data 205, 210, and 215 to the requesting client computing environment (e.g., client computing environment 220, client computing environment 225, or client computing environment 230). As part of processing requests for reputation data 205, 210, and 215, intelligent reputation engine 250 can utilize a plurality of data comprising verification data 240, community data 242, reputation guidelines 245, and/or reputation histories data 247. Also, as shown in FIG. 2, client computing environments 220, 225, and 230 are capable of processing content production/sharing data 205, 210, and 215 for display and interaction to one or more participating users (not shown).

Figure 3:
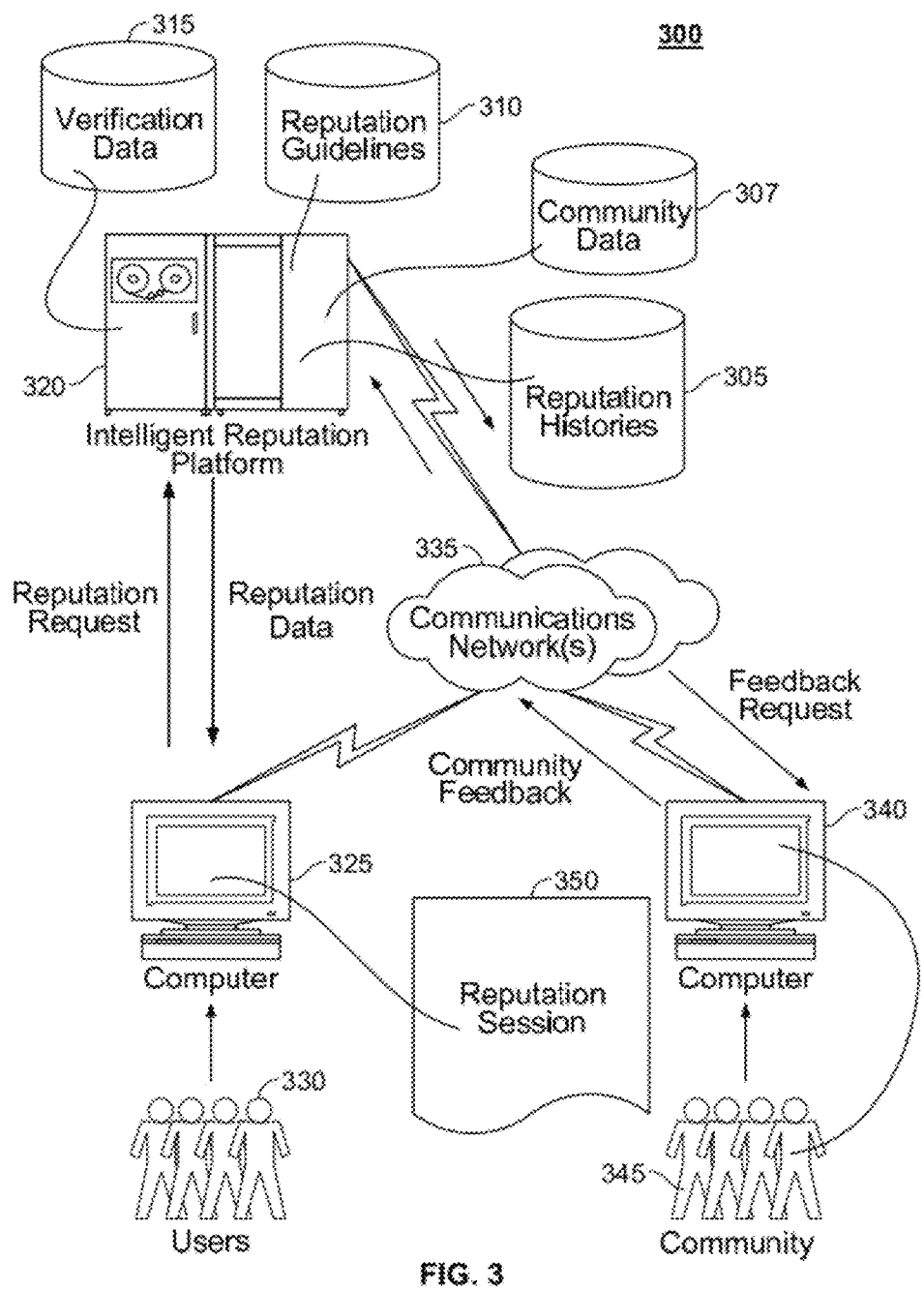
FIG. 3 is a block diagram showing an illustrative block representation of an illustrative system in accordance with some embodiments.

FIG. 3 is a block diagram showing an illustrative block representation of an illustrative system in accordance with some embodiments. In particular, FIG. 3 shows a detailed illustrative implementation of exemplary reputation attribution environment 300 in accordance with some embodiments. As shown in FIG. 3, exemplary content reputation attribution environment 300 includes intelligent reputation platform 320, verification data store 315, reputation guidelines data store 310, reputation histories data store 305, community data store 307, user computing environment 325, reputation targets (e.g., users) 330, community computing environment 340, and community 345. Additionally, as shown in FIG. 3, reputation attribution environment 300 includes reputation session content 350, which can be displayed, viewed, transmitted and/or printed from user computing environment 325 and/or community computing environment 340.

In some embodiments, in an illustrative implementation, intelligent reputation platform 320 can be electronically coupled to user computing environment 325 and community computing environment 340 via communications network 335. In some embodiments, communications network 335 includes fixed-wire (e.g., wire line) and/or wireless intranets, extranets, and/or the Internet.

In some embodiments, in an illustrative operation, users 330 can interact with a reputation data interface (not shown) operating on user computing environment 325 to provide requests to initiate a reputation session that are passed across communications network 335 to intelligent reputation platform 320. In the illustrative operation, intelligent reputation platform 320 can process requests for a reputation session and cooperate with interactive verification data store 315, reputation guidelines data store 310, reputation histories data store 305, and community data store 307 to generate a reputation session for use by users 330 and community 345.

In some embodiments, in an illustrative implementation, verification data store 315 can include data representative of connections between users 330 and community members 345. Such data can include but is not limited to connections between users to identify a degree of association for use in generation of reputation data. In the illustrative implementation, reputation guideline data store 310 can include data representative of one or more rules for attributing reputations amongst users 330 and community 345. Reputation histories data store 305 can include one or more generated reputation attributions for use as part of reputation data processing. Community data store 307 can include data representative of community feedback for generated reputation data. For example, the data representative of connections can be provided through user input or generated from any number of techniques including but not limited to automated or computer-assisted processing of data available on computer networks, links expressed or implied between entities on social networking websites, user commentary or "blogging" websites, or any other form of document available on the Internet.

Figure 4:
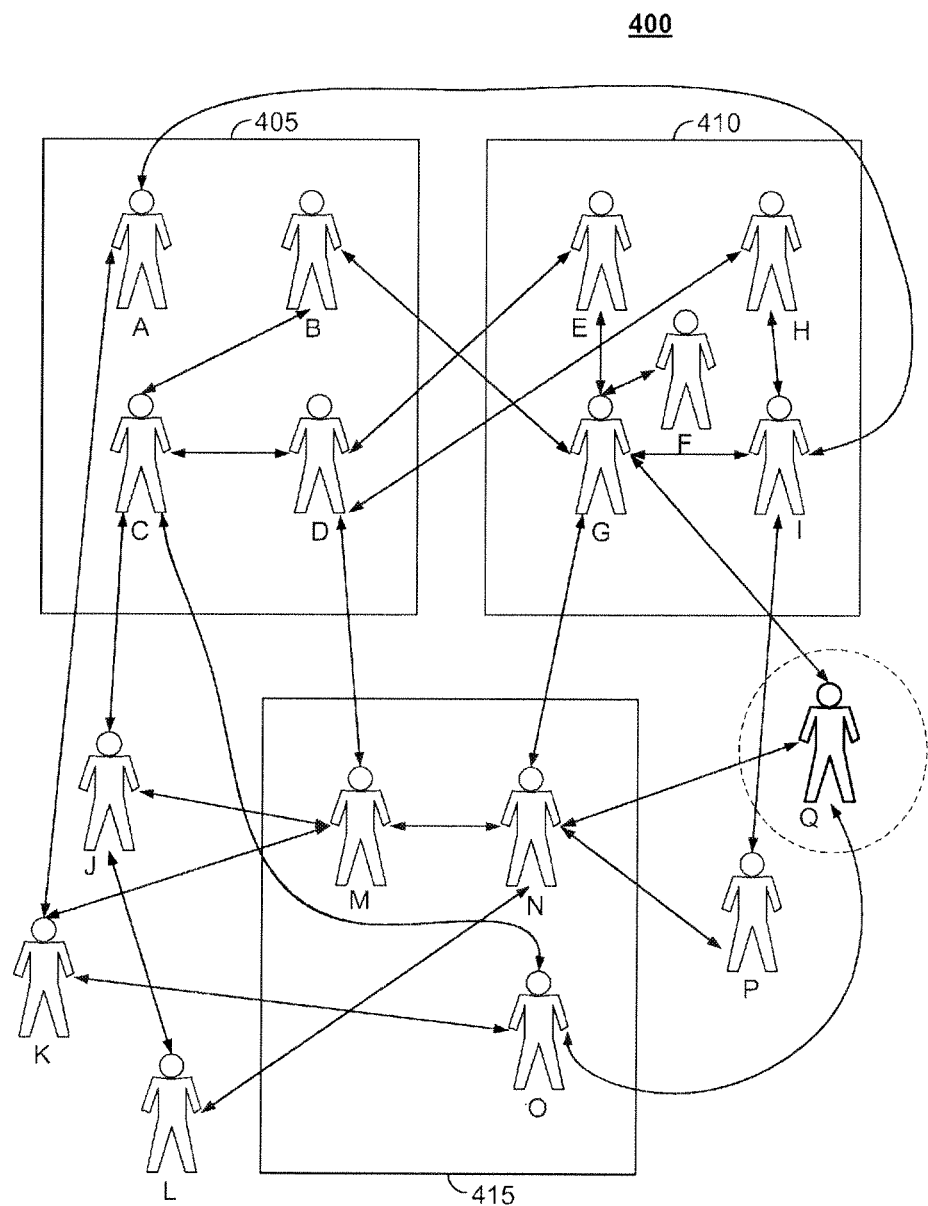
FIG. 4 is a block diagram describing the interaction of various parties of an exemplary referral environment in accordance with some embodiments.

FIG. 4 is a block diagram describing the interaction of various parties of an exemplary referral environment in accordance with some embodiments. In particular, FIG. 4 shows contributing elements of exemplary reputation attribution environment 400 in accordance with some embodiments. As shown, exemplary reputation attribution environment 400 comprises a plurality of sub-environments 405, 410, and 415 and numerous reputation targets A-Q. As shown, reputation targets can have direct and/or indirect connections with other reputations targets within a given sub-environment 405, 410, or 415 and/or with other reputation targets that are outside sub-environments 405, 410, 415.

In some embodiments, in an illustrative implementation, sub-environments 405, 410, or 415 can represent one or more facets of a reputation target's experience, such as work, home, school, club(s), and/or church/temple/commune. In the illustrative implementation, an exemplary reputation target Q can inquire about the reputation of other reputation targets (e.g., obtain trusted data for use to assist in making a decision, determine an affinity, and/or identify a dislike). The individual reputations of each of the target participants can be derived according to the herein described techniques (e.g., in FIGS. 5 and 6) so that each reputation target is attributed one or more reputation indicators (e.g., a reputation score associated for restaurant referrals, another reputation score associated for movie referrals, another reputation score associated for match-making, etc.). The reputation indicators can be calculated based on the degree and number of relationships between reputation targets in a given sub-environment and/or outside of a sub-environment. Once calculated, an exemplary reputation target Q can query other reputation targets for trusted data (e.g., recommendations and/or referrals) and can process such trusted data according to reputation score of the data source (e.g., reputation target).

For example, sub-environment 405 can represent a place of business, sub-environment 410 can represent home, and sub-environment can represent a country club. In some embodiments, in an illustrative operation, each of the reputation targets of reputation attribution environment 400 can be attributed one or more reputation scores (e.g., reputation score for business data, reputation score for family data, etc.). In the illustrative operation, the reputation score for each reputation target for each category (e.g., business, family, social, religious, etc.) can be calculated according to the degree of relationship with other reputation targets and/or the number of connections with other relationship targets.

In some embodiments, in the illustrative operation, reputation target Q can request data regarding a business problem (e.g., how to broker a transaction). Responsive to the request, the reputation targets of sub-environment 405 (e.g., reputation target can act as data sources for reputation target Q) providing data that can satisfy reputation target Q's request. Additionally, other reputation targets, who are not directly part of sub-environment 405, can also act as data sources to reputation target Q. In this context, the reputation score for reputation targets A, B, C, and/or D) can have a higher reputation score than other reputation targets not part of sub-environment 405 as such reputation targets are within sub-environment 405, which is focused on business. In the illustrative operation, other reputation targets not part of sub-environment 405 can have equal or near level reputation scores to reputation targets (A, B, C, and/or D) of sub-environment 405 based on the connections with reputation targets A, B, C, and/or D and reputation target Q. For example, as shown in FIG. 4, reputation target I can have a relatively high reputation score as it pertains to business as reputation target I has a number of direct and indirect connections (I-A, I-G-B, I-H-D, I-G-E-D) to reputation targets (e.g., A, B, C, and/or D) of sub-environment 405 and to inquiring reputation target Q.

It is appreciated that although exemplary reputation attribution environment 400 of FIG. 4 is shown have a configuration of sub-environments having various participants, that such description is merely illustrative the contemplated reputation attribution environment of the herein described systems and methods can have numerous sub-environments with various participants in various non-described configurations.

Figure 5:
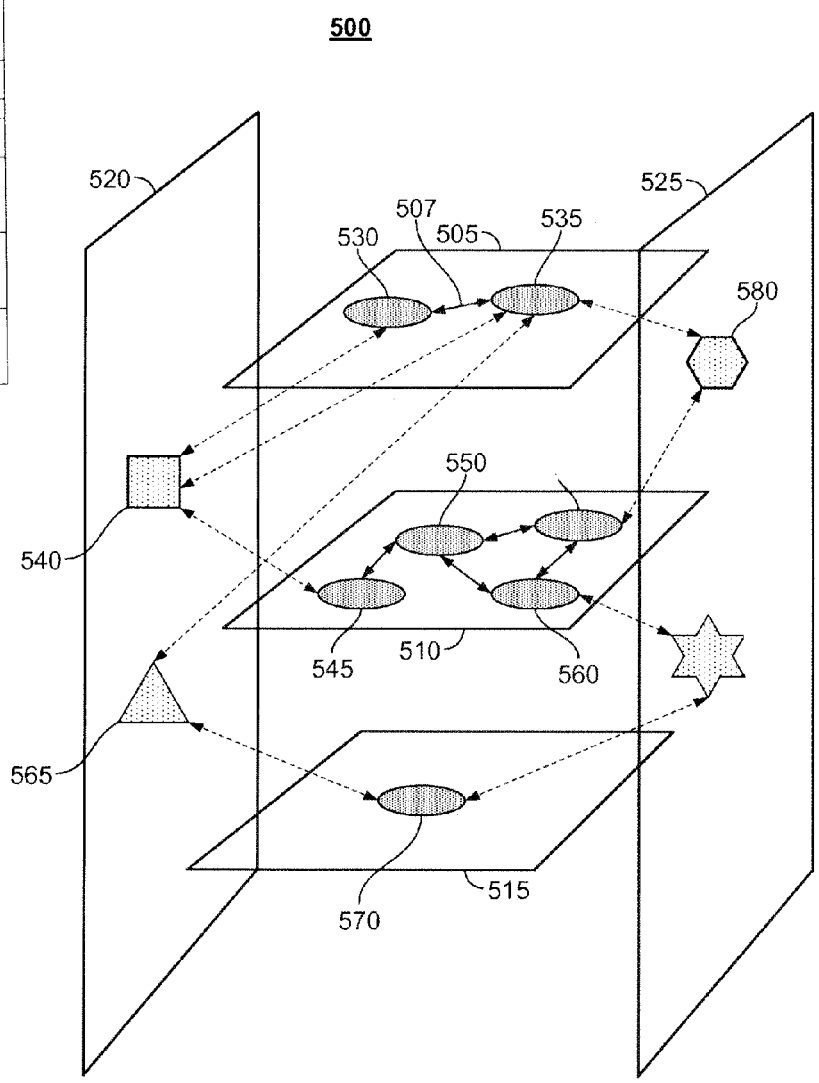
FIG. 5 is a block diagram of the search space of an exemplary referral environment in accordance with some embodiments.

FIG. 5 is a block diagram of the search space of an exemplary referral environment in accordance with some embodiments. In particular, FIG. 5 shows exemplary reputation scoring environment 500 in accordance with some embodiments. As shown in FIG. 5, reputation scoring environment 500 includes a plurality of dimensions 505, 510, and 515, which are operatively coupled to one or more transitive dimensions 520 and 525. Further, as shown, reputation scoring environment 500 includes one or more entities 530, 535, 545, 550, 560, and 570 residing on one or more of dimensions 505, 510, and 515 as well as transitive connectors 540, 565, 570, and 580 residing on transitive dimensions 520 and 525.

In some embodiments, in an illustrative operation, scores for one or more entities 530, 535, 545, 550, 560 and/or 570 can be determined on a network (not shown) on a given dimension 505, 510 and/or 515. In the illustrative operation, an entity 530, 535, 545, 550, 560 and/or 570 can be directly linked to any number of other entities 530, 535, 545, 550, 560 and/or 570 on any number of dimensions 505, 510, and/or 515 (e.g., such that each link, direct or indirect link, can be associated with a score). For example, one or more dimension 505, 510, and/or 515 can have an associated one or more transitive dimension 520 and/or 525.

In the illustrative operation, a directed path 507 on a given dimension 505 between two entities 530 and 535, a source and a target, includes a directed link from the source entity 530 (e.g., illustratively 530 as all entities 530, 535, 545, 550, 560, and/or 570 can be source and/or target entities depending on the perspective of the scoring attribution platform as described herein in accordance with various embodiments) to an intermediate entity 540, prefixed to a directed path from the intermediate entity 540 to the target entity 535.

In some embodiments, in an illustrative implementation, links on the path can be on one or more transitive dimensions 520 and/or 525 associated with a given dimension 505, 510, and/or 515. For example, to determine a score on a given dimension 505, 510, and/or 515 between a source entity 530 and a target entity 535, directed paths 507 on the given dimension 505, 510, and/or 515 can be determined through any kind of graph search (not shown). In the illustrative operation, the individual scores on the one or more links on the one or more paths can be combined to produce one or more resulting scores using various techniques for propagating scores and for resolving conflicts between different scores. For example, one or more intermediate entities 540, 565, 570, and/or 580 can also be provided with a measure of influence on the dimensions 505, 510 and/or 515 based on the universe of source entities (e.g., 530, 535, 545, 550, 560, 570), the universe of target entities (e.g., 530, 535, 545, 550, 560, 570) and the links between them.

It is appreciated that although reputation scoring environment 500 is shown to have a particular configuration operating to an illustrative operation with a particular number of dimensions, transitive dimensions, entities, direct connections and indirect connections that such description is merely illustrative as the influence calculation within the herein described techniques can employ various dimensions, transitive dimensions, entities, direct, and/or indirect connections having various configurations and assemblages operating according to other illustrative operations.

Figure 6:
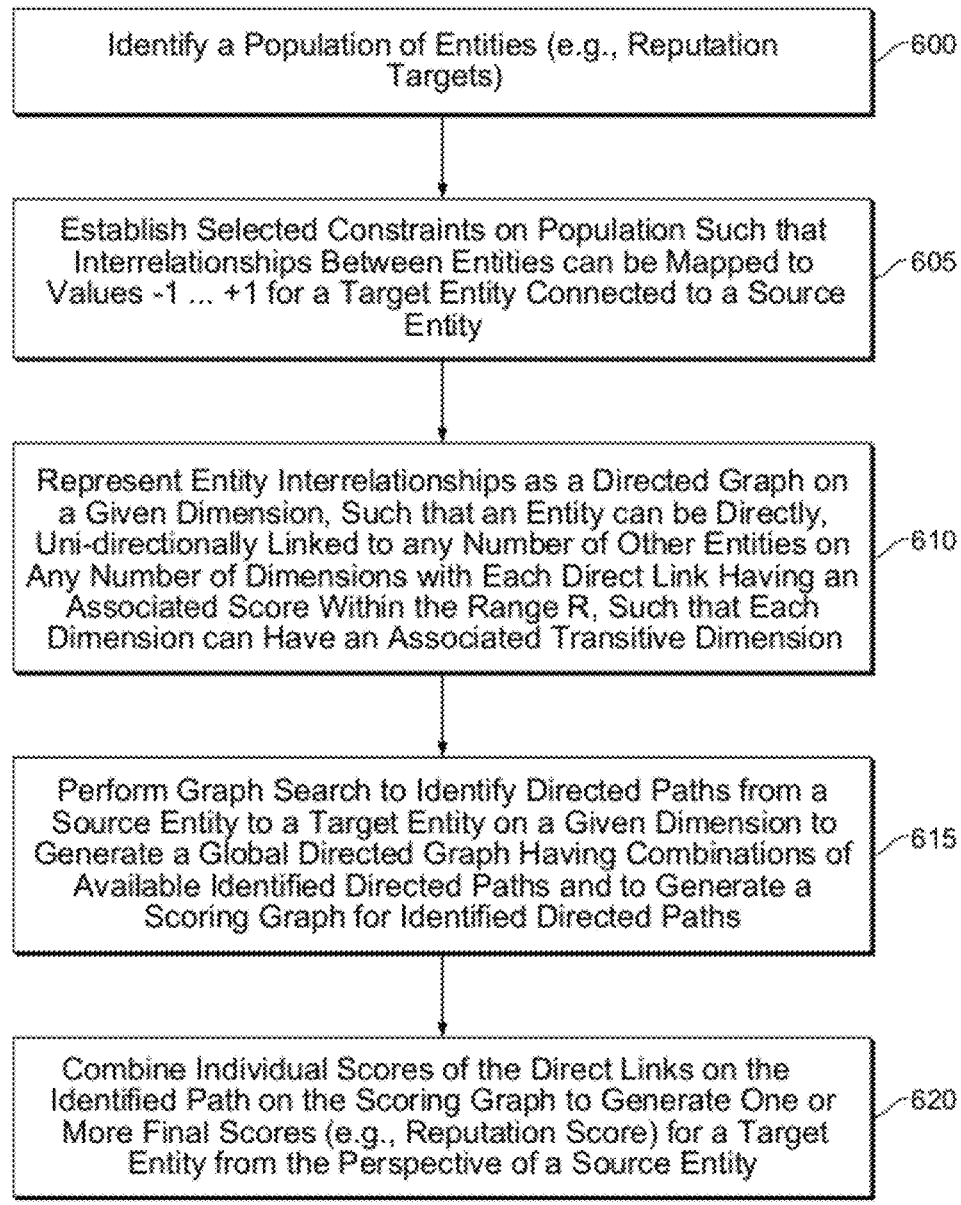
FIG. 6 is a flow diagram showing illustrative processing performed in generating referrals in accordance with some embodiments.

FIG. 6 is a flow diagram showing illustrative processing performed in generating referrals in accordance with some embodiments. In particular, FIG. 6 shows exemplary processing in calculating reputations scores in accordance with some embodiments. As shown in FIG. 6, processing begins at block 600 at which a population of entities are identified. From there processing proceeds to block 605 at which selected constraints are established on the identified population such that the interrelationships between the entities can be mapped to values −1 to +1 for a target entity connected to source entity. Processing then proceeds to block 610 at which entity relationships are represented as a directed graph on a given dimension such that an entity can be directly, uni-directionally linked to any number of other entities on any number of dimensions with each direct link having an associated score within a selected range R such that each dimension can have therewith an associated transitive dimension. From there, processing proceeds to block 615 at which a graph search is performed to identify directed paths from a source entity to a target entity on a given dimension to generate a global directed graph having combinations of available identified directed paths and to generate a scoring graph for identified directed paths. Processing then proceeds to block 620 at which individual scores of the direct links on an identified path can be combined to generate one or more final scores (e.g., reputation score) for a target entity from the perspective of a source entity.

In some embodiments, in an illustrative implementation, the processing of FIG. 6 can be performed such that for a population of entities, a method of determining scores, each within the range R which can be mapped to the values −1 . . . +1, for a target entity connected to a source entity on a network that can be conceptually represented as a directed graph on each given dimension, such that an entity can be directly, uni-directionally linked to any number of other entities on any number of dimensions, with each direct link having an associated score within the range R. Further, each dimension can have an associated transitive dimension and such that a directed path on a given dimension between two entities, a source entity and a target entity, can be defined as a direct link from the source entity to an intermediate entity, prefixed to a directed path from the intermediate entity to the target entity, subject to the selected constraints including but not limited to: 1) a direct link from any entity to the target entity must be on the given dimension, and 2) a direct link on the path from any entity to an intermediate entity that is not the target entity must be either on the transitive dimension associated with the given dimension, or on the given dimension itself if the given dimension is itself is a transitive dimension.

Furthermore, in the illustrative operation, the processing of FIG. 6 can include but is not limited to: (A) performing a graph search (e.g., using various graph search techniques) to identify directed paths from a source entity to a target entity on a given dimension subject to the above definition of a directed path that, for example, optimally results in a directed graph combining all such identified directed paths. The resulting directed graph, for example, provides a scoring graph that can be stored separately. In the illustrative operation, individual scores can be combined (B) on each direct link on each path on the scoring graph to produce one or more final scores, with or without an associated set of confidence values in the range $C=0 \ldots 1$ for each resulting score, for the target entity from the perspective of the source entity. In the illustrative operation, the acts (A) and (B) can be performed, for example, in sequence, or performed simultaneously; when performed simultaneously, the combination of individual scores described in act (B) being performed during the graph search described in act (A) without the creation of separately stored scoring graph; and wherein the graph search performed in act (A) can be optimized by some combination of scores identified through act (B) such that the optimization may result in the exclusion of certain paths between the source entity and the target entity.

In some embodiments, in an illustrative operation of the herein described techniques using various systems and methods, the influence of each entity can, for example, be estimated as the count of other entities with direct links to the entity or with a path, possibly with a predefined maximum length, to the entity; with or without the count being adjusted by the possible weights on each link, the length of each path, and the level of each entity on each path.

In some embodiments, in an illustrative operation of the herein described techniques using various systems and methods, the influence of each entity can be estimated with the adjusted count calculated through the operations described herein, transformed into a rank or percentile relative to the similarly measured influence of all other entities.

In some embodiments, in an illustrative operation of the herein described techniques using various systems and methods, the influence of each entity can be estimated as the count of actual requests for data, opinion, or searches relating to or originating from other entities, entities with direct links to the entity or with a path, possibly with a predefined maximum length, to the entity; such actual requests being counted if they result in the use of the paths originating from the entity (e.g., representing opinions, reviews, citations or other forms of expression) with or without the count being adjusted by the possible weights on each link, the length of each path, and the level of each entity on each path.

In some embodiments, in an illustrative operation of the herein described techniques using various systems and methods, the influence of each entity can be estimated as the count of actual requests for data, opinion, or searches relating to or originating from other entities, entities with direct links to the entity or with a path, possibly with a predefined maximum length, to the entity; such actual requests being counted if they occur within a predefined period of time and result in the use of the paths originating from the entity (e.g., representing opinions, reviews, citations or other forms of expression) with or without the count being adjusted by the possible weights on each link, the length of each path, and the level of each entity on each path.

In some embodiments, in an illustrative operation of the herein described techniques using various systems and methods, the influence of each entity can be estimated with the adjusted count calculated through the operations described herein, transformed into a rank or percentile relative to the similarly measured influence of all other entities.

In some embodiments, in an illustrative operation of the herein described techniques using various systems and methods, the influence of each entity can be estimated by applying to it any of several graph metric functions, such as centrality or betweenness, in which the functions, such as centrality or betweenness, can be estimated either by relating the entity to the entire graph including all linked entities, or by relating the entity to a subgraph including all entities linked to the entities directly or by paths of up to a given length.

In some embodiments, the illustrative operations described herein for the calculation of influence can be performed for each dimension separately, resulting in one influence measure for each entity for each dimension; for all dimensions together, resulting in one influence measure for each entity; or for any given subgroup of dimensions together applied to any given entity, resulting in each entity having as many influence measures as the number of subgroups of dimensions applied to that entity.

In some embodiments, in an illustrative operation of the herein described techniques using various systems and methods, the influence of each entity as estimated in each of the operations described herein, can be adjusted by metrics relating to the graph comprising all entities or a subset of all linked entities. For example, such metrics can include the density of the graph, defined as the ratio of the number of links to the number of linked entities in the graph; such metrics can be transformed by mathematical functions optimal to the topology of the graph, especially where it is known that the distribution of links among entities in a given graph may be non-linear. An example of such an adjustment would be the operation of estimating the influence of an entity as the number of directed links connecting to the entity, divided by the logarithm of the density of the graph comprising all linked entities. Such an operation can provide an optimal method of estimating influence rapidly with a limited degree of computational complexity.

In some embodiments, in an illustrative operation of the herein described techniques using various systems and methods, in which the influence of entities as estimated in each of the operations described herein can be estimated for separate, unconnected graphs; and for which such influence estimated for entities in separate, unconnected graphs can be adjusted by applying metrics relating to each separate unconnected graph in its entirety, as shown in the operation described herein; the influence of each entity on one graph, thus adjusted, can be normalized and compared to the influence of another entity on another graph, also thus adjusted. For example, such an operation allows for the use of influence measures across separate, unconnected graphs.

In some embodiments, in an illustrative operation of the herein described techniques using various systems and methods, the estimation of influence can be optimized for different contexts and requirements of performance, memory, graph topology, number of entities, etc., by any combination of the operations described above in paragraphs above, and any similar operations involving metrics including but not limited to values comprising: the number of potential source entities to the entity for which influence is to be estimated, the number of potential target entities, the number of potential directed paths between any one entity and any other entity on any or all given dimensions, the number of potential directed paths that include the entity, the number of times within a defined period that a directed link from the entity is used for a scoring, search or other operation.

In some embodiments, in an illustrative implementation of this system applied to the World Wide Web and documents, data and information on the Internet, such data and information are modeled (as shown in FIG. 1) as documents, or objects, and authors, or subjects, in which subjects are representation of any entities that make citations, in which citations include the expression of opinions on other subjects or objects, expressions of authors in the form of postings to blogs, Wikipedia entries, postings to social media such as Twitter or Jaiku, postings to websites, postings in the form of reviews, recommendations, or any other form of citation made to mailing lists, newsgroups, discussion forums, comments to websites or any other form of Internet publication; in which citations by one subject regarding another subject, such as a recommendation of one author by another, is treated as representing an expression of trustworthiness, for example, limited to category or categories identified or imputed, and citations by one subject regarding an object, such as a recommendation of a website, or a restaurant review, is treated as representation an expression of opinion or description; in which citations are treated as edges on a network where subjects and objects form nodes; and where reputation is determined for subjects and objects and influence is determined for subjects and where objects are be identified, selected and ranked based on the reputation ascribed to them or the influence of subjects citing objects or the date of the citations or the content of citations matching search terms or the content of documents matching search terms, or any computation of rank and selection based on a function of any combination of these variables and additional variables.

In some embodiments, in an illustrative implementation of the techniques described herein is implemented as follows; in which users can provide text, referred to here as "search terms", and for every object represented, such as by a Uniform Resource Locator ("URL"), calculations are made for all represented citations of that object in order to determine semantic weights such as term frequency-inverse document frequency ("TF-IDF"), as well as the influence of the author of each such citation of each object, and a function of the semantic weight and influence of all citations of each object results in a score for the object on the basis of which a ranking of objects is performed and a ranked list of objects is presented to the user; and where the score is used as a threshold for the selection of objects, and where other ranking criteria (e.g., first, last, modal, median date of citations of the object) is used in some combination with the score.

In some embodiments, in an illustrative implementation of the techniques described herein provides for the selection score and object ranking as a combination of not only the citation score for objects and the influence score for subjects citing them, but an expertise score for each subject citing each such object, based on the citations from each subject matching descriptive criteria ("search terms" or ontologically similar terms) as a relative share of all citations from that subject, and citations from all subjects matching above-described descriptive criteria as a relative share of citations from all subjects.

In some embodiments, in an illustrative implementation of the techniques described herein provides for the selection score and object ranking as a combination of not only the citation score for objects and the reputation score for subjects citing them, but an expertise score for each subject citing each such object, based on the citations from each subject matching descriptive criteria ("search terms" or ontologically similar terms) as a relative share of all citations from that subject, and citations from all subjects matching above-described descriptive criteria as a relative share of citations from all subjects.

It is understood that the herein described techniques using various systems and methods are susceptible to various modifications and alternative constructions. There is no intention to limit the herein described systems and methods to the specific constructions described herein. On the contrary, the herein described systems and methods are intended to cover all modifications, alternative constructions, and equivalents falling within the scope and spirit of the herein described techniques using, for example, various systems and methods.

It should also be noted that the herein described systems and methods can be implemented in a variety of electronic environments (including both non-wireless and wireless computer environments, including cell phones and video phones), partial computing environments, and real world environments. The various techniques described herein may be implemented in hardware or software, or a combination of both. In some embodiments, the techniques are implemented in computing environments maintaining programmable computers that include a computer network, processor, servers, and a storage medium readable by the processor (including volatile and non-volatile memory and/or storage elements), at least one input device, and at least one output device. Computing hardware logic cooperating with various instructions sets are applied to data to perform the functions described above and to generate output information. The output information is applied to one or more output devices. For example, programs used by the exemplary computing hardware can be implemented in various programming languages, including high level procedural or object oriented programming language to communicate with a computer system. Illustratively the herein described techniques using various apparatus and methods may be implemented in assembly or machine language, if desired. In any case, the language may be a compiled or interpreted language. In some embodiments, each such computer program can be stored on a storage medium or device (e.g., ROM or magnetic disk) that is readable by a general or special purpose programmable computer for configuring and operating the computer when the storage medium or device is read by the computer to perform the procedures described above. In some embodiments, the apparatus may also be considered to be implemented as a computer-readable storage medium, configured with a computer program, where the storage medium so configured causes a computer to operate in a specific and predefined manner.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving a graph, with a subset of the graph being a subject graph of subject nodes that includes at least one or more subjects linked to one or more other subjects, the graph including one or more objects each linked to one or more subjects in the subject graph, each subject being a user, each object being a content item, and each edge in the graph representing a citation and each citation representing an expression of opinion or description by a subject on an object;

determining reputation scores for one or more subjects based on connections among the subjects in the graph, wherein the reputation scores indicate the reputation of the subjects;

selecting only a subset of citations for each object from among all the citations citing each object, the content of the citations in the selected subset matching one or more of the search terms for the search query, a different subset of citations being selectable for a same object when a different search query is provided;

assigning citation scores to any subset of a plurality of objects, the citation scores indicating relevance of the objects cited by citations and are determined based at least in part on matching one or more search terms with the content of the citations of the objects by the one or more subjects, the selection scores for an object computed for each search query based on a subset of subjects citing the object, with the subjects in the subset being the subjects of previously selected subsets of citations to each object;

combining the citation scores for the objects and the reputation scores for the subjects citing the objects to calculate selection scores for the objects determined based on matching the one or more search terms with the content of the citations, the selection scores for an object computed for each search query based on a subset of subjects citing the object, with the subjects in the subset being the subjects of previously selected subsets of citations to each object, a different selection score computed for the same object when a different search query is provided; and selecting and ranking the objects based on the selection scores of the objects, a different ranking computed for a same set or overlapping sets of objects when the search query is different.

2. The method recited in claim 1, wherein the objects include books, films, music, documents, websites, objects for sale, objects that are reviewed or recommended or cited, or any entities that are associated with a Uniform Resource Identifier (URI), wherein the subjects include entities representing authors of Internet content or users of social media services including one or more of the following: blogs, Twitter, and reviews on Internet web sites, wherein the links are citations of objects from subjects including one or more of the following: Tweets, blog posts, and reviews of objects on Internet web sites.

3. The method recited in claim 1, further comprising: receiving descriptive criteria from a user.

4. The method recited in claim 1, further comprising: receiving search terms, wherein the search terms are provided in a search query, and wherein the search terms are included in the descriptive criteria.

5. The method recited in claim 1, further comprising: displaying a subset of top ranked objects based on the selection scores.

6. The method recited in claim 1, further comprising:
receiving search terms, wherein the search terms are provided in a search query; and
displaying a subset of top ranked objects based on the selection scores, wherein the top ranked objects based on the selection scores provide a subjective based search result.

7. The method recited in claim 1, further comprising:
determining a content score for an object based on the description criteria; wherein the selection score is based on the citation score, the subjective reputation score, and the content score.

8. The method recited in claim 1, further comprising:
determining an expertise score for each subject citing each object based on a second descriptive criteria, wherein the selection score is based on the citation score, the subjective reputation score, and the expertise score.

9. A computer-implemented method, comprising:

receiving a graph, with a subset of the graph being a subject graph of subject nodes that includes at least one or more subjects linked to one or more other subjects, the graph including one or more objects each linked to one or more subjects in the subject graph, each subject being a user, each object being a content item, and each edge in the graph representing a citation and each citation representing an expression of opinion or description by a subject on an object;

determining reputation scores for a first dimension for one or more objects from a perspective of a first subject based on connections among the subjects in the graph, wherein the reputation scores indicate the reputation of the subjects; and selecting only a subset of citations for each object from among all the citations citing each object, the content of the citations in the selected subset matching one or more of the search terms for the search query, a different subset of citations being selectable for a same object when a different search query is provided;

assigning citation scores to any subset of a plurality of objects, wherein the citation scores indicate relevance of the objects cited by citations and are determined based at least in part on matching of one or more search terms with the content of the citations of the objects by the one or more subjects, the selection scores for an object computed for each search query based on a subset of subjects citing the object, with the subjects in the subset being the subjects of previously selected subsets of citations to each object;

combining the citation scores for the objects and the reputation scores for the subjects citing the objects to calculate selection scores for the objects determined based on matching of the one or more search terms with the content of the citations, the selection scores for an object computed for each search query based on a subset of subjects citing the object, with the subjects in the subset being the subjects of previously selected subsets of citations to each object, a different selection score computed for the same object when a different search query is provided;

selecting and ranking the objects based on the reputation scores and matching of one or more search terms with the content of the citations citing the objects, a different ranking computed for a same set or overlapping sets of objects when the search query is different; and displaying the ranked objects as search result to a user or providing the search result in machine readable form.

10. The method recited in claim 9, wherein the objects include books, films, music, documents, websites, objects for sale, objects that are reviewed or recommended or cited, or any entities that are associated with a Uniform Resource Identifier (URI), wherein the subjects include entities representing Internet authors or users of social media services including one or more of the following: blogs, Twitter, and reviews on Internet web sites, wherein the links are citations of the objects from the subjects including one or more of the following: Tweets, Blog posts, and reviews of objects on Internet web sites.

11. The method recited in claim 9, wherein the first dimension includes search terms.

12. The method recited in claim 9, further comprising: receiving descriptive criteria.

13. The method recited in claim 9, further comprising:
receiving search terms, wherein the search terms are provided in a search query, and wherein the search terms are included in the descriptive criteria.

14. The method recited in claim 9, further comprising:
displaying a subset of top ranked objects based on the reputation scores.

15. The method recited in claim 9, further comprising:
receiving search terms, wherein the search terms are provided in a search query; and
displaying a subset of top ranked objects based on the reputation scores, wherein the top ranked objects based on the reputation scores provide a subjective based search result.

16. The method recited in claim 9, further comprising:
determining a content score for one or more objects based on the description criteria;
wherein a selection score for each object is based on the subjective reputation score and the content score; and
ranking the one or more objects based on the selection score for each object.

17. A computer-implemented method, comprising:
receiving a graph, wherein a subset of the graph is a subject graph of subject nodes that includes at least one or more subjects linked to one or more other subjects, and wherein the graph includes one or more objects, wherein each linked to one or more subjects in the subject graph, wherein each subject is a user, and each object is a content item, and wherein each edge in the graph represents a citation, wherein each citation represents an expression of opinion or description by a subject on an object;
determining influence scores for one or more subjects based on connections among the subjects in the graph, wherein the reputation scores indicate the reputation of the subjects;
selecting only a subset of citations for each object from among all the citations citing each object, where a different subset of citations being selectable for a same object when a different search query is provided;
assigning citation scores to any subset of a plurality of the objects from the perspective of any subjects, wherein the citation score indicate relevance of the objects cited by citations and are based at least in part on matching of one or more search terms with the content of the citations of the objects by the one or more subjects;
wherein the citation scores for an object are computed for each search query as they are computed based on the selected subset of citations for the object where the content of the citations in the subset matches one or more of the search terms for the search query;
combining the citation scores for the objects and the influence scores for the subjects citing those objects to calculate selection scores for the objects determined based on matching of the one or more search terms with the content of the citations;
wherein the selection scores for an object are computed for each search query as they are computed based on a subset of subjects citing the object where the subjects in the subset are comprised of the subjects of the previously selected subsets of citations to each object; and
selecting and ranking the objects based on the selection scores of the objects; and
displaying the ranked objects as search result to a user or providing the search result in machine readable form.

18. The method recited in claim 17, wherein the objects include books, films, music, documents, websites, objects for sale, objects that are reviewed or recommended or cited, or any entities that are associated with a Uniform Resource Identifier (URI), wherein the subjects include entities representing Internet authors or users of social media services including one or more of the following: blogs, Twitter, and reviews on Internet web sites, wherein the links are citations of the objects from the subjects including one or more of the following: Tweets, Blog posts, and reviews of objects on Internet web sites.

19. The method recited in claim 17, further comprising:
receiving descriptive criteria.

20. The method recited in claim 17, further comprising:
receiving search terms, wherein the search terms are provided in a search query, and wherein the search terms are included in the descriptive criteria.

21. The method recited in claim 17, further comprising:
displaying a subset of top ranked objects based on the selection scores, wherein the top ranked objects based on the selection scores provide an influence based search result.

22. The method recited in claim 17, further comprising:
determining a content score for a first object based on the description criteria; wherein the selection score is based on the citation score, the influence score, and the content score.

23. The method recited in claim 17, further comprising:
determining an expertise score for each subject citing each object based on a second descriptive criteria, wherein the selection score is based on the citation score, the influence score, and the expertise score.

24. The method recited in claim 17, further comprising:
determining a content score for a first object based on a first description criteria; wherein the selection score is based on the citation score, the influence score, and the content score; and
determining an expertise score for each subject citing each object based on a second descriptive criteria, wherein the selection score is based on the citation score, the influence score, and the expertise score, and wherein the second descriptive criteria includes the first descriptive criteria.

25. The method recited in claim 17, wherein the selection score and object ranking is a combination of the citation score for objects and the influence score for subjects citing to the objects and an expertise score for each subject citing each object based on the citations from each subject matching descriptive criteria as a relative share of all citations from the subject, and citations from all subjects matching the descriptive criteria as a relative share of citations from all subjects.

26. The method recited in claim 17, wherein the selection score and object ranking is a combination of the citation score for objects and the reputation score for subjects citing to the object and an expertise score for each subject citing each object based on the citations from each subject matching descriptive criteria as a relative share of all citations from the subject and citations from all subjects matching the descriptive criteria as a relative share of citations from all subjects.

27. The method recited in claim 17, wherein search terms include one or more of the following search criteria: geography, language, and time.

* * * * *